United States Patent
Kuhnly et al.

(12)

(10) Patent No.: US 6,307,200 B1
(45) Date of Patent: Oct. 23, 2001

(54) PASSIVE INFRARED SENSOR APPARATUS AND METHOD WITH DC OFFSET COMPENSATION

(75) Inventors: Keith D. Kuhnly, Lino Lakes; Paul G. Saldin, Oakdale, both of MN (US); Robert E. Brunius, East Sound, WA (US)

(73) Assignee: Interactive Technologies, Inc., N. St. Paul, MN (US)

( * ) Notice: Subject to any disclaimer, the term of this patent is extended or adjusted under 35 U.S.C. 154(b) by 0 days.

(21) Appl. No.: 09/266,137

(22) Filed: Mar. 10, 1999

(51) Int. Cl.[7] ....................................................... G01J 5/24
(52) U.S. Cl. .......................................................... 250/338.1
(58) Field of Search ........................................... 250/338.1

(56) References Cited

U.S. PATENT DOCUMENTS

| | | | |
|---|---|---|---|
| 3,609,365 | * 9/1971 | Malinowski et al. | 250/338.1 |
| 3,895,182 | * 7/1975 | Trilling | 348/167 |
| 4,636,774 | 1/1987 | Galvin et al. | 340/565 |
| 4,764,755 | 8/1988 | Pedtke et al. | 340/541 |
| 4,769,545 | 9/1988 | Fraden | 250/353 |
| 4,875,029 | 10/1989 | Guscott et al. | 340/567 |
| 5,077,549 | 12/1991 | Hershkovitz et al. | 340/567 |
| 5,084,696 | 1/1992 | Guscott et al. | 340/541 |
| 5,276,427 | 1/1994 | Peterson | 340/522 |
| 5,331,308 | 7/1994 | Buccola et al. | 340/522 |
| 5,382,944 | 1/1995 | Dipoala et al. | 340/567 |
| 5,394,035 | 2/1995 | Elwell | 327/72 |
| 5,414,263 | 5/1995 | Haslam et al. | 250/338.1 |
| 5,444,431 | 8/1995 | Kenny | 340/541 |
| 5,444,432 | 8/1995 | Pildner et al. | 340/567 |
| 5,504,473 | 4/1996 | Cecic et al. | 340/541 |
| 5,629,676 | 5/1997 | Kartoun et al. | 340/567 |
| 5,870,022 | 2/1999 | Kuhnly et al. | 340/567 |
| 5,925,880 | 7/1999 | Young et al. | 250/252.1 |

\* cited by examiner

*Primary Examiner*—Constantine Hannaher
(74) *Attorney, Agent, or Firm*—Fish & Richardson, P.C., P.A.

(57) ABSTRACT

A PIR sensor apparatus and method make use of a dc amplifier circuit. The dc amplifier circuit amplifies a dc-coupled sensor signal generated by a PIR sensor for analysis. For improved accuracy, the dc amplifier circuit is controlled to compensate for dc offset in the sensor signal. In this manner, the dc amplifier circuit is capable of reducing false triggering and inhibited triggering due to excessive dc offset. The amplifier is dc-coupled to an output of the PIR sensor to receive the sensor signal. A detector detects a level of dc offset within the sensor signal. A controller controls the amplifier to compensate for the detected level of dc offset. The amplifier may include a differential amplifier having a first input that receives the sensor signal and a second input that receives a reference voltage. A resistor-capacitor circuit can be provided to set the reference voltage received by the second input of the amplifier. The detector and controller may be realized by a processor that detects the level of dc offset in the sensor signal, and charges the capacitor in the resistor-capacitor circuit at a duty cycle selected to adjust the reference voltage to compensate for the dc offset.

20 Claims, 3 Drawing Sheets

PASSIVE INFRARED SENSOR APPARATUS AND METHOD WITH DC OFFSET COMPENSATION

TECHNICAL FIELD

The present invention relates to passive infrared (PIR) motion detectors and, more particularly, to amplifier circuitry for processing signals generated by a PIR sensor.

BACKGROUND

In many security systems, PIR motion detectors are distributed within a monitored area to detect intruders, e.g., for commercial or home security applications. A PIR motion detector is typically mounted on a wall, in a corner of a room, or on a ceiling, to detect motion in a monitored area. A PIR motion detector includes a PIR sensor that generates a sensor signal representing a change in infrared energy, thereby providing an indication of intruder motion within the monitored area. The PIR motion detector typically includes an amplifier circuit that amplifies the sensor signal for analysis. The amplified sensor signal is analyzed by comparison to an amplitude threshold that corresponds to the presence of an intruder.

The output of a PIR sensor can be susceptible to drift, and can introduce dc offset to the sensor signal. Drift can result from environmental effects or component aging. Also, the level of dc offset produced by different PIR sensors can vary due to differences in manufacture or materials. With the introduction of significant dc offset, the amplified sensor signal can communicate inaccurate information relative to the pertinent threshold, causing false alarm triggering or inhibiting proper alarm triggering. Thus, substantial dc offset can cause false triggering when no intruder is present in the monitored area. Also, dc offset can boost sensor signals that ordinarily would fall below the threshold, e.g., signals generated based on the presence of pets or other small animals. In either case, the result is an inability to accurately detect intruders and take appropriate action.

To improve accuracy, PIR motion detectors typically incorporate ac-coupled amplifiers that eliminate dc offset from the PIR sensor signal prior to amplification. AC-coupling also serves to normalize the range of output levels produced by different sensors. The use of ac-coupled amplifiers drives up the cost and complexity of the PIR motion detector, however, due to the need for additional components. Also, ac-coupled amplifiers can be susceptible to "overshoot" problems that undermine the accuracy of the sensors. For example, an ac-coupled amplifier can suffer from overshoot when the PIR sensors generate a strong signal change, and particularly when the amplifier saturates.

Following a significant signal excursion, the amplifier must drive itself back toward a steady state condition. With insufficient damping, the amplifier can be driven beyond steady state and into an overshoot condition. For example, instead of returning from a negative signal excursion to a reference level, the amplifier output may substantially exceed the reference level. A substantial overshoot, when compared to the pertinent alarm threshold, can be misinterpreted as a security event. Consequently, like dc offset, overshoot in the sensor signal produced by an ac-coupled sensor signal can cause false triggering situations.

SUMMARY

The present invention is directed to a PIR sensor apparatus and method that make use of a dc amplifier circuit. The PIR sensor apparatus can be incorporated in a PIR motion detector. The dc amplifier circuit amplifies a dc-coupled sensor signal generated by a PIR sensor for analysis. Each PIR sensor produces a characteristic dc output voltage, along with a signal that varies with the level of infrared energy in the monitored area. This dc output voltage will be referred to herein as dc offset. For improved accuracy, the dc amplifier circuit compensates for the dc offset of the sensor signal. Compensation, as used herein, refers to eliminating, reducing, canceling, or otherwise alleviating adverse effects of the dc offset on sensor signal accuracy. Also, the dc amplifier circuit generally does not suffer from the overshoot problems associated with ac amplifier circuits. In this manner, the dc amplifier circuit is capable of reducing false triggering or inhibited triggering incidents and improving triggering accuracy.

In one embodiment, the present invention provides a passive infrared (PIR) sensor apparatus comprising a PIR sensor that generates a sensor signal, an amplifier, dc-coupled to the PIR sensor, that amplifies the sensor signal, and a circuit that compensates for dc offset in the sensor signal.

In another embodiment, the present invention provides a method for processing a passive infrared (FIR) sensor signal comprising dc coupling a sensor signal from a PIR sensor to an amplifier, amplifying the sensor signal with the amplifier, and compensating for dc offset in the sensor signal.

In an added embodiment, the present invention provides a passive infrared (PIR) sensor apparatus comprising means for generating a PIR sensor signal, means, dc-coupled to the PIR sensor, for amplifying the sensor signal, and means for compensating for dc offset in the sensor signal.

In a further embodiment, the present invention provides a passive infrared (PIR) sensor apparatus comprising a PIR sensor that generates a sensor signal, an amplifier that amplifies the sensor signal to produce an amplified sensor signal, the amplifier being dc-coupled to an output of the PIR sensor to receive the sensor signal, wherein the amplifier includes a differential amplifier having a first input that receives the sensor signal and a second input that receives a reference voltage, a resistor-capacitor circuit that sets the reference voltage received by the second input of the amplifier, and a detector that detects a level of the dc offset in the sensor signal, and a controller that charges a capacitor in the resistor-capacitor circuit at a duty cycle selected to adjust the reference voltage to compensate for the dc offset in the sensor signal.

In another embodiment, the present invention provides a passive infrared (PIR) sensor apparatus comprising a PIR sensor that generates a sensor signal, an amplifier that amplifies the sensor signal to produce an amplified sensor signal, the amplifier being dc-coupled to an output of the PIR sensor to receive the sensor signal, wherein the amplifier includes a differential amplifier having a first input that receives the sensor signal and a second input that receives a reference voltage, and a controller that adjusts the reference voltage to compensate for the dc offset in the sensor signal.

In a further embodiment, the present invention provides a passive infrared (PIR) sensor apparatus comprising a PIR sensor that generates a sensor signal, means for amplifying the sensor signal to produce an amplified sensor signal, wherein the amplifying means is de-coupled to an output of the PIR sensor to receive the sensor signal, and means for controlling the amplifier to cancel at least a portion of the dc offset in the sensor signal.

The level of the dc offset in the sensor signal can be detected by reference to the amplified sensor signal produced by the amplifier. Detection and control can be implemented by processes executed by a processor, or by discrete circuitry. The amplifier may take the form of a differential amplifier having a first input that receives the sensor signal and a second input that receives a reference voltage. In this case, the control signal generated by the controller adjusts the reference voltage received by the second input of the differential amplifier to compensate for dc offset in the sensor signal. The reference voltage serves to cancel at least a portion of the dc offset in the sensor signal.

The sensor apparatus may include a resistor-capacitor circuit, for example, that sets the reference voltage for the amplifier. In some embodiments, the controller charges the capacitor in the resistor-capacitor circuit at a duty cycle selected to adjust the reference voltage to compensate for the dc offset. A processor can be programmed to adjust the reference voltage in incremental steps until the dc offset in the sensor signal is canceled to an acceptable level. In particular, a processor can be programmed to periodically detect the level of dc offset in the sensor signal, and adjust the duty cycle of the control signal to restore the dc offset to a desired range. As an alternative, a processor can be programmed to provide an analog output that serves as the reference voltage.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
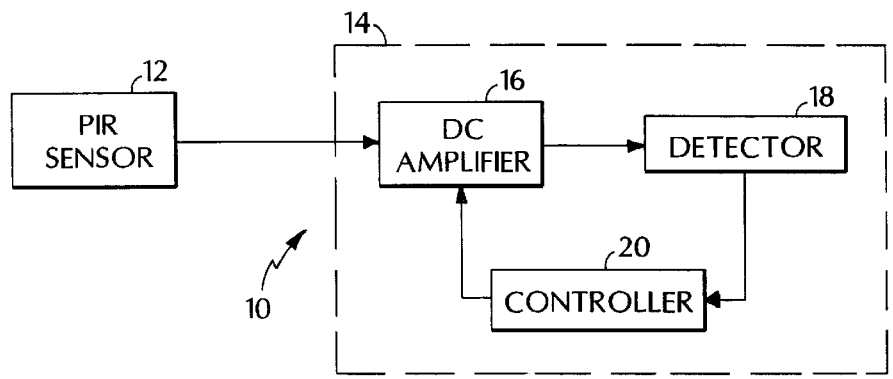
FIG. 1 is a functional block diagram of a PIR sensor apparatus having a dc amplifier circuit.

FIG. 1 is a functional block diagram of a passive infrared (PIR) sensor apparatus 10 having a PIR sensor 12 and a dc amplifier circuit 14. When an intruder enters the area, PIR sensor 12 generates a sensor signal indicative of activity within a monitored area. The amplitude and/or frequency of the sensor signal changes as function of intruder activity such as motion. The dc amplifier circuit 14 includes an amplifier 16 that is dc-coupled to an output of PIR sensor 12 to receive the sensor signal. Amplifier 16 produces an amplified sensor signal for analysis, e.g., relative to an amplitude threshold.

A detector 18 detects a level of dc offset in the sensor signal. The dc offset may be detected directly from the sensor signal generated by PIR sensor 12 or from the amplified sensor signal generated by amplifier 16. In an embodiment described herein, however, the level of dc offset is detected by reference to the amplified sensor signal. A controller 20 controls dc amplifier 16 based on the detected level of dc offset to compensate for the dc offset in the sensor signal. Compensation refers to eliminating, reducing, canceling, or otherwise alleviating adverse effects of the dc offset on sensor signal accuracy. By compensating for the dc offset, dc amplifier circuit 14 improves the accuracy of the amplified PIR signal, reducing the occurrence of false triggering or inhibited triggering.

PIR sensor 12 may take the form of any conventional PIR sensor suitable for intruder detection. In particular, PIR sensor 12 may include a pair of heat sensor elements (not shown). Each of the heat sensor elements may comprise a pyroelectric material, or other infrared sensitive material, that generates electric charge in response to incident infrared radiation. An example of a commercially available PIR sensor is marketed as part of the DS924 motion detector, made by Interactive Technologies Inc. (ITI) and Detection Systems, Inc., and marketed by ITI under part number 60-511-01-95.

PIR sensor 12 may include a fresnel lens array, as is well known in the art. The lens array divides the monitored area into detection zones, and focuses radiation from the detection zones onto the heat sensor elements. The heat sensor elements generate sensor element signals with opposite polarities in response to the incident radiation. PIR sensor 12 sums the oppositely poled sensor element signals generated by the heat sensor elements to produce the PIR sensor signal. In the absence of an intruder, the sum of the sensor element signals should be less than the applicable alarm threshold. When an intruder is present, however, and moving infrared energy is directed alternately on one sensor element and then the other, PIR sensor 12 produces a PIR sensor signal, which should exceed the alarm threshold.

Over time, the response of the pair of heat sensor elements can drift, introducing dc offset into the sensor element signals and, hence, the sensor signal. Also, different PIR sensors can have different characteristic dc output levels due to differences in manufacture or materials. Amplifier 22 also may introduce a small characteristic dc offset. With a high gain, the dc offset of amplifier 22 can be significant, and contribute to problems of false triggering or inhibited triggering. A PIR sensor apparatus in accordance with the present invention can alleviate the effects of dc offset on the amplified sensor signal.

Figure 2:
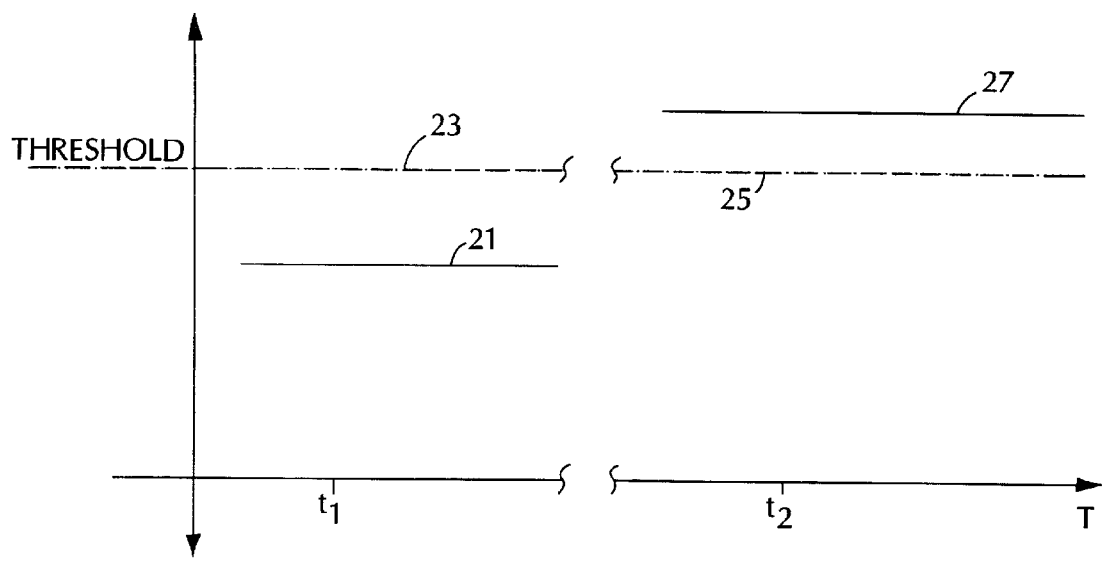
FIG. 2 is a graph illustrating the presence of dc offset in a PIR sensor signal.

FIG. 2 is a graph illustrating the presence of dc offset in a PIR sensor signal. In FIG. 2, a sensor signal is shown as having a constant level. In practice, the waveform of the sensor signal will depend on intruder activity. With reference to the example of FIG. 2, prior to the introduction of dc offset, at time t1, a first portion 21 of the sensor signal resides at a reference level. At time t1, it is assumed that no intruder is present within the monitored area. Thus, the sensor signal remains below an applicable detection threshold 23. At a later time t2, however, a second portion 27 of the sensor signal has acquired a more substantial dc offset due to drift in PIR sensor 12 and/or the amplifier used to amplify the PIR sensor signal. Consequently, the sensor signal exceeds detection threshold 25, causing false triggering of PIR sensor apparatus 10. In other cases, the dc offset may cause inhibited triggering.

Figure 3:
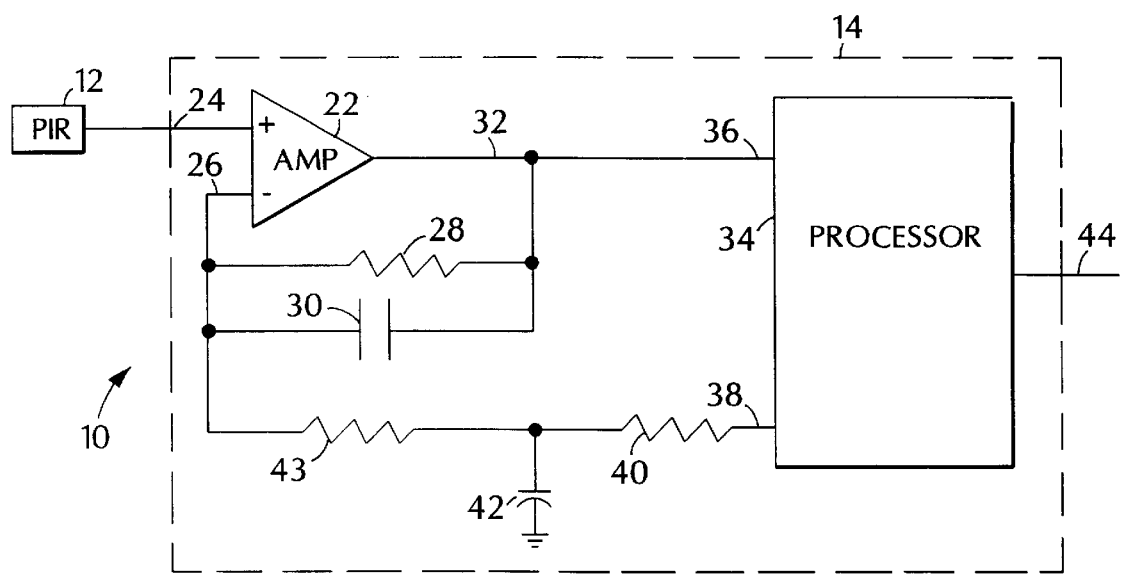
FIG. 3 is a circuit diagram illustrating a PIR sensor apparatus having a dc amplifier circuit.

FIG. 3 is a circuit diagram illustrating PIR sensor 12 with dc amplifier circuit 14. As shown in FIG. 3, the output of PIR sensor 12 is dc-coupled to a differential amplifier 22. Amplifier 22 is arranged in a non-inverting configuration and has a first non-inverting input 24 and a second inverting input 26. Resistor 28 and capacitor 30 are connected in parallel between second input 26 and an output 32 of amplifier 22, forming a feedback loop. Amplifier 22 amplifies the sensor signal received at input 24, and produces an amplified sensor signal at output 32. The amplified sensor signal is proportional to the gain determined by the ratio of resistors 28 and 43, and the difference signal formed between inputs 24, 26. Capacitor 30 sets the high-frequency cut-off frequency for amplifier 22.

Detector 18 and controller 20 can be implemented as processes executed by a processor 34 Processor 34 receives the amplified sensor signal from amplifier 22 at processor input 54. Processor 34 may take the form of a conventional general purpose single- or multi-chip microprocessor. An example of a suitable microprocessor is the Microchip 16LC73 marketed by Microchip Technology Incorporated, or the EM Microelectronic EM6617. Alternatively, processor 34 may take the form of a conventional special purpose microprocessor. In either case, processor 34 can be housed within the PIR sensor housing along with PIR sensor 12, amplifier 22, and other associated electronics for amplifying and processing the sensor signal. In a wireless embodiment, for example, the PIR sensor housing may include transmitter electronics for communication with a remote device. Processor 34, PIR sensor 12, dc amplifier 22 and associated electronics can be mounted on a common printed circuit board within the PIR sensor housing.

Processor 34 can be programmed to detect the level of dc offset in the amplified sensor signal received at processor input 36, and generate a control signal to control amplifier 22. DC offset can be detected, for example, simply by measuring the level of the amplified sensor signal in the absence of intruder activity. Alternatively, the level of the sensor signal can be compared to a level or range. Processor 34 may be selected to include analog-to-digital and digital-to-analog conversion circuitry for processing of the amplified sensor signal and generation of the control signal. The control signal can be applied to control amplifier 22 via processor output 38. As shown in FIG. 3, the control signal can be applied to a resistor-capacitor network formed by resistor 40 and capacitor 42. Resistor 40 is coupled between the common connection of resistor 43 and capacitor 42 and processor output 38. Capacitor 42 is coupled between the common connection of resistor 43 and resistor 40 and ground.

Capacitor 42, in combination with resistor 40, sets a reference voltage applied to inverting input 26 of amplifier 22. In particular, capacitor 42 stores a charge potential that sets a reference voltage at inverting input 26. Processor 34 selectively charges capacitor 42 to control the reference voltage applied to input 26 based on the dc offset detected in the amplified sensor signal at processor input 36. Again, in a steady state condition, i.e., in the absence of intruders, the dc offset level can be determined by simply detecting the level of the amplified sensor signal. Without intruder activity, the amplified sensor signal should yield only the dc output voltage of sensor 12, as amplified by amplifier 22. The reference voltage determines the differential signal applied across amplifier input 24, 26. Thus, the reference voltage applied to input 26 can be adjusted to cancel at least a portion of the dc offset present in the PIR signal applied to input 24.

Processor 34 can be programmed to produce, for example, a pulse train at output 38 having a selectable duty cycle that forms the control signal and, hence, determines the charge applied to capacitor 42. Based on the detected level of dc offset in the amplified sensor signal at amplifier output 32, processor 34 varies the duty cycle of the control signal. Resistor 40 and capacitor 42 exhibit a discharge (R-C) time constant. Processor 34 varies the duty cycle of the control signal in view of the time constant to maintain the reference voltage at a desired level.

If the amount of dc offset in the amplified sensor signal increases, processor 34 increases the duty cycle of the control signal at processor output 38 to increase the charge on capacitor 42 and the reference voltage applied to amplifier input 26. In this manner, processor 34 increases the reference voltage to cancel the increased level of dc offset, or at least reduce its effects to an acceptable level. Similarly, if the dc offset decreases, processor 34 decreases the duty cycle, thereby decreasing the charge on capacitor 42 and the reference voltage applied to amplifier input 26.

Processor 34 may detect a particular level of dc offset in the amplified sensor signal. In this case, processor 34 can be programmed to adjust the duty cycle at output 38 by an amount proportional to the detected level. Alternatively, processor 34 may simply compare the amplified sensor signal to a desired range of dc offset. In the event the dc offset is outside of the range, processor 34 increases or decreases the duty cycle at output 38, as appropriate, in a single step or by an incremental, step-wise process. With an incremental approach, processor 34 repeatedly samples the amplified sensor signal and continues to increment the duty cycle until the dc offset in the amplified sensor signal is restored to the acceptable range.

In the above manner, processor 34 controls the amount of charge at capacitor 42, thereby controlling the reference voltage applied to input 26. In particular, processor 34 controls the amount of charge at capacitor 42 to produce a reference voltage that cancels, at least partially, the dc offset present in the sensor signal applied to input 24 of amplifier 22. Adjustment of the reference voltage thereby serves to reduce the level of dc offset in the amplified sensor signal received at input 36 of processor 34.

In the example of FIG. 3, processor 34 detects the level of dc offset in the sensor signal by reference to the amplified sensor signal produced at output 32 of amplifier 22. In this manner, processor 34 is also capable of detecting the dc offset in the amplified sensor signal including the dc offset contribution, if any, introduced by amplifier 22 itself. Accordingly, processor 34 is capable of compensating for dc offset in the sensor signal, which generally is most important, as well as dc offset within amplifier 22.

An incremental approach generally involves detection of successive samples of the amplified sensor signal. If the dc offset in the amplified sensor signal remains outside of the desired range, as indicated by a subsequent sample, processor 34 again increments the duty cycle. The process continues until the dc offset in the amplified sensor signal is restored to the desired range. An incremental adjustment of the duty cycle at output 38 allows a simple comparison of the dc offset in the amplified sensor signal to a range, and may be more desirable in terms of processing resources.

Upon reduction of the dc offset, processor 34 analyzes the amplified sensor signal relative to an amplitude threshold. In the event the amplitude of the amplified sensor signal exceeds the threshold, processor 34 may generate an alarm signal at output 44. Alternatively, processor 34 may continue to sample the amplified sensor signal and generate the alarm signal if the amplified signal continues to exceed the threshold in a predetermined number of subsequent samples. The alarm signal may be transmitted to a central controller for notification of security personnel.

If the amplitude of the amplified sensor signal does not exceed the threshold, the processor 34 continues to sample the amplified sensor signal and detect changes in the dc offset. If the dc offset changes, processor 34 adjusts the duty cycle of the control signal in a corresponding manner, e.g., incrementally or by a calculated amount, thereby maintaining the level of dc offset in the amplified sensor signal within a desired range.

To determine an initial reference voltage and duty cycle, processor 34 can be programmed to execute an initialization routine. Prior to or upon deployment of detector 10, e.g., upon power-up, processor 34 executes the initialization routine to detect an initial level of dc offset in the amplified sensor signal. Upon initialization, processor 34 generates an initial control signal at output 38 with a default duty cycle. If the amplified sensor signal has a level of dc offset that exceeds a desired range, processor 34 increases or decreases the duty cycle, relative to the default, to reduce the initial level of dc offset.

In the absence of intruder activity, the sensor signal received at input 24 should be at a reference level. With an initial level of dc offset, however, the sensor signal produces some deviation. Hence, the initialization routine is executed to determine this level, and provide a compensating or "canceling" dc offset in the reference voltage applied at input 26 With the reference voltage adjusted properly, the amplified sensor signal at output 32 should approach the reference level.

Some amount of dc offset with positive or negative polarity may be small enough to avoid false triggering or inhibited triggering. Thus, in many embodiments, it may not be necessary to completely cancel the dc offset present in the sensor signal. Instead, it may be sufficient to reduce the dc offset to a range that is not large enough to induce false triggering or inhibited triggering. Accordingly, in some cases, the amplified sensor signal still may have a significant dc offset level following the initialization routine.

Following the initialization routine, PIR sensor 12 can be susceptible to further drift. Thus, the sensor signal produced by PIR sensor 12 can be susceptible to further changes in the level of dc offset. To track such changes relative to the initial level, processor 34 periodically monitors the amplified sensor signal during operation, performing an update routine. Processor 34 may be programmed to monitor dc offset changes in the amplified sensor signal continuously or on a periodic basis, e.g., once per second, minute, or hour, maintaining the accuracy of PIR sensor apparatus 10.

As an illustration, in the absence of intruder activity, processor 34 measures the level of dc offset in the amplified sensor signal by comparing the signal to a desired level. If the signal has deviated from the desired level, processor 34 determines whether the deviation is positive or negative and the magnitude of the deviation. If the deviation is positive, processor 34 adjusts the duty cycle of the control signal at output 38 to increase the charge on capacitor 42, and thereby increase the reference voltage at amplifier input 26 by an amount sufficient to cancel the increase. Alternatively, if the deviation is negative and exceeds an acceptable level, processor 34 adjusts the duty cycle of the control signal to decrease the reference voltage by an amount sufficient to cancel at least a portion of the decrease.

Figure 4:
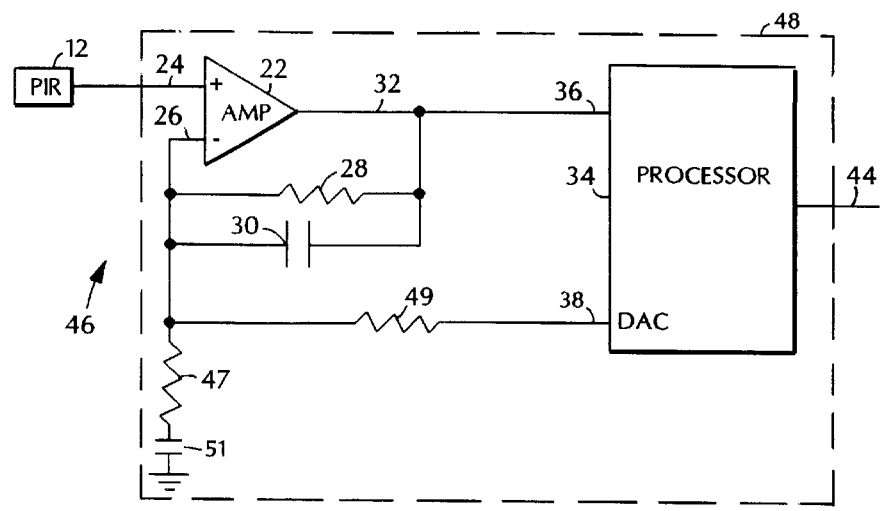
FIG. 4 is a circuit diagram illustrating a PIR sensor apparatus having an alternative dc amplifier circuit.

FIG. 4 is a circuit diagram illustrating a PIR sensor apparatus 46 having an alternative dc amplifier circuit 48. PIR sensor apparatus 46 conforms substantially to apparatus 10 of FIG. 3. Resistor 28 and 47 set the gain of amplifier 22, while capacitor 30 sets the high frequency cut-off frequency. Instead of using a resistor-capacitor circuit to set the reference voltage at input 26, however, dc amplifier circuit 48 makes direct use of the digital-to-analog conversion capabilities of processor 34. Specifically, in dc amplifier circuit 48, output 38 of processor 34 provides an analog signal that serves as the reference voltage signal.

A buffer resistor 49 may be provided between output 38 and the common connection between resistor 47 and input 26. A capacitor 51 can be added in series between resistor 47 and ground to set the low frequency cut-off of amplifier 22. In this embodiment, it is not necessary for processor 34 to set a duty cycle. Rather, processor 34 simply adjusts the level of the output signal at output 38 to provide a reference voltage at input 26 of amplifier 22 that is sufficient to cancel at least a portion of the dc offset in the PIR sensor signal applied to input 24.

As in the embodiment of FIG. 3, processor 34 executes detection and control aspects of amplifier circuit 48. For example, processor 34 monitors the amplified sensor signal produced at output 32 of amplifier 22, and determines whether the level of dc offset in the amplified sensor signal exceeds a desired range. In this manner, processor 34 is capable of detecting dc offset in the amplified sensor signal due to both dc offset in the PIR sensor signal applied to input 24, and dc offset in amplifier 22. To cancel the offset, however, processor 34 directly controls the reference voltage applied to input 26 via analog output 38.

Figure 5:
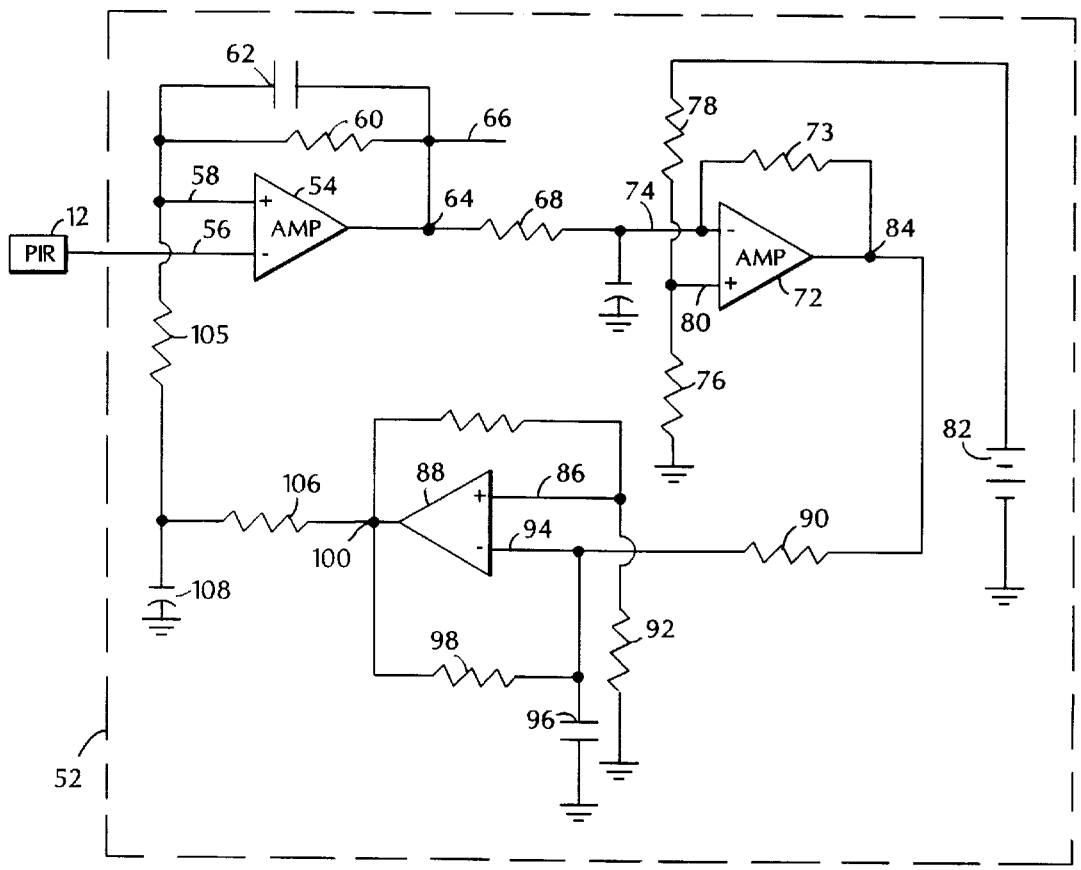
FIG. 5 is a circuit diagram illustrating a PIR sensor apparatus having another alternative dc amplifier circuit.

FIG. 5 is a circuit diagram illustrating a PIR sensor apparatus 50 having another alternative dc amplifier circuit 52. In the embodiment of FIG. 5, circuit 52 includes a differential amplifier 54 having a non-inverting input 56 and an inverting input 58. Non-inverting input 56 is dc-coupled to the output of PIR sensor 12 to receive the PIR sensor signal. Resistor 60 and capacitor 62 are connected in parallel between input 58 and output 64 of amplifier 54, forming a feedback loop. Resistor 60 and resistor 105, coupled between input 58 and ground via a capacitor 108, set the gain of amplifier 54. The amplified sensor signal is available, e.g., at terminal 66, for comparison to an applicable alarm threshold by a comparator (not shown).

A resistor 68 and capacitor 70 form a low pass filter input to amplifier 72, which forms part of a detector circuit that compares the low frequency component of the amplified sensor signal to a desired dc offset threshold. Specifically, inverting input 74 of amplifier 72 receives the amplified sensor signal from output 64 via the filter formed by resistor 68 and capacitor 70. A voltage divider, formed by resistors 76, 78 provides a reference voltage to non-inverting input 80 of amplifier 72. Resistors 76, 78 divide a voltage provided by voltage source 82.

Voltage source 82 or resistors 76 or 78 could be adjusted to set the reference voltage at input 80, and thereby determine the desired threshold dc offset level for comparison to the amplified sensor signal. Amplifier 72 provides an output indicative of the level of the amplified sensor signal relative to the dc offset threshold. In particular, output 84 of amplifier 72 produces an output that is either positive or negative depending on whether the amplified sensor signal is above or below the dc offset range prescribed by the dc offset threshold. A resistor 73 is coupled between input 74 and output 84. The output is proportional to the amount of dc offset in the amplified sensor signal. In this manner, amplifier 72 operates as a detector to provide an indication of the level of dc offset in the PIR sensor signal.

Output 84 of amplifier 72 is coupled to the inverting input 94 of a comparator 88, which forms part of an oscillator circuit. The oscillator circuit sets the duty cycle of current applied to a resistor-capacitor circuit. The resistor-capacitor circuit incorporates a resistor 106 coupled in series between output 100 and inverting input 58 of amplifier 54, and a capacitor 108 coupled between inverting input 58 of amplifier 54 and ground. Comparator 88 thereby forms part of a circuit that functions as a controller. A resistor 105, coupled between the common connection of capacitor 108 and resistor 106 and input 58, sets the gain of amplifier 54 in combination with resistor 60.

A resistor 98 is coupled between output 100 and inverting input 94 of comparator 88, whereas resistor 102 is coupled between output 100 and non-inverting input 86. Resistors 102, 92 form a voltage divider that sets the reference voltage for application to non-inverting input 86. Inverting input 94 of comparator 88 is coupled to ground via a capacitor 96. Resistor 98, capacitor 96, and resistor 102 set the duty cycle of the oscillator. Resistor 102 introduces hysteresis. A resistor 90 is coupled between output 84 of amplifier 72 and inverting input 94 to adjust the inverting input and thereby affect the duty cycle of the oscillator.

When output 84 of amplifier 72 increases, the duty cycle of the oscillator formed by comparator 88 decreases. When output 84 of amplifier 72 decreases, the duty cycle of the oscillator increases. In this manner, comparator 88 controls the duty cycle based on the level of dc offset detected by amplifier 72. In turn, the duty cycle controls the charge on capacitor 108 and thereby adjusts the reference voltage applied to input 58 of amplifier 54. Resistor 106 and capacitor 108 have an RC time constant that determines the charge-discharge cycle of capacitor 108. Comparator 88 drives resistor 106 and capacitor 108 at a duty cycle determined by the output 84 of amplifier 72.

When the amplified sensor signal received at input 74 of amplifier 72 has a dc offset that exceeds the threshold at input 80, the signal at output 84 decreases. Comparator 88 responds by increasing the duty cycle of the pulsed signal at output 100. Consequently, the charge on capacitor 108 increases, as does the reference voltage at inverting input 58 of amplifier 54. In this manner, comparator 88 and its associated circuitry adjusts the reference voltage to cancel at least a portion of the dc offset in the PIR sensor signal received from sensor 12. At the same time, detection amplifier 72 and control comparator 88 are responsive to dc offset induced by amplifier 54. In either case, the dc offset in the amplified sensor signal is reduced to an acceptable level to avoid false or inhibited triggering.

Figure 6:
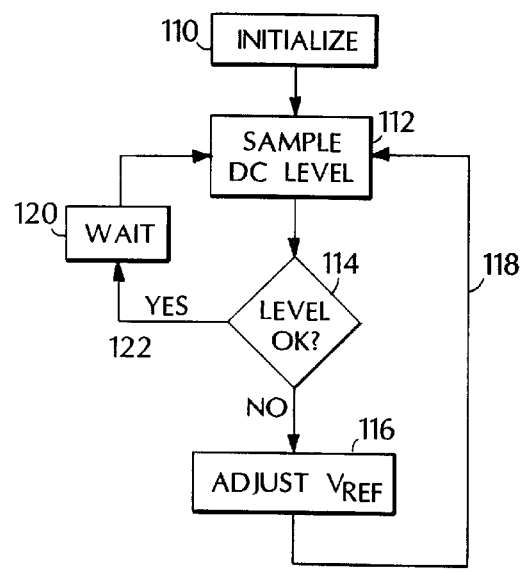
FIG. 6 is a flow diagram illustrating a method for compensating dc offset in a PIR sensor signal.

FIG. 6 is a flow diagram illustrating a method for compensating for dc offset in a PIR sensor signal. A method as shown in FIG. 6 can be used in both an initialization routine and periodically to compensate for dc offset, and can be executed by a processor 34 as shown in FIGS. 3 and 4, or by other discrete circuitry. The method will be described generally with reference to the systems of FIGS. 3 and 4. Following the start of the compensation routine, indicated by block 110, processor 34 first samples the amplified sensor signal, as indicated by block 112.

Processor 34 then determines the level of dc offset, for example, by comparing the amplified sensor signal to some reference level, which may be a nonzero value in some embodiments. On this basis, processor 34 determines whether the level of dc offset in the sensor signal is acceptable, as indicated by block 114. If not, processor 34 adjusts the reference voltage applied to amplifier 22, as indicated by block 116, e.g., directly or by adjusting the duty cycle applied to a resistor-capacitor circuit.

Processor 34 then takes another sample and checks the level of dc offset again, as indicated by loop 118. The process continues until the dc offset of the amplified sensor signal is driven back into an acceptable range. The adjustment made by processor 34 can be proportional to the level of dc offset or take the form of a fixed increment. If the level of dc offset is acceptable, processor 34 takes another sample after a delay period indicated by block 120 and loop 122.

A number of embodiments of the present invention have been described. Nevertheless, it will be understood that various modifications may be made without departing from the spirit and scope of the invention. Accordingly, other embodiments are within the scope of the following claims.

What is claimed is:

1. A passive infrared (PIR) sensor apparatus comprising:
   a PIR sensor that generates a sensor signal;
   an amplifier, dc-coupled to the PIR sensor, that amplifies the sensor signal; and
   a circuit that compensates for dc offset in the sensor signal;
   wherein the amplifier includes a differential amplifier having a first input that receives the sensor signal and a second input that receives a reference voltage, and the circuit adjusts the reference voltage to cancel at least a portion of the dc offset in the sensor signal in incremental steps until the dc offset in the sensor signal is reduced to an acceptable level.

2. The apparatus of claim 1, wherein the circuit includes a detector that detects dc offset in the sensor signal and a controller that controls the amplifier based on the detected dc offset to reduce dc offset in the amplified sensor signal.

3. The apparatus of claim 2, wherein the detector detects dc offset in the sensor signal by detecting dc offset in the amplified sensor signal.

4. The apparatus of claim 2, wherein the controller and the detector are implemented by processes executed by a microprocessor, the microprocessor being programmed to detect dc offset in the amplified sensor signal, and generate a control signal to control the amplifier in response to detection of dc offset.

5. The apparatus of claim 4, wherein the amplifier includes a differential amplifier, the differential amplifier having a first input that receives the sensor signal and a second input that receives a reference voltage, and wherein the control signal generated by the microprocessor adjusts the reference voltage received by the second input of the differential amplifier to cancel at least a portion of the dc offset in the sensor signal.

6. The apparatus of claim 5, further comprising a resistor-capacitor circuit that sets the reference voltage, wherein control signal charges a capacitor in the resistor-capacitor circuit at a duty cycle selected to adjust the reference voltage to cancel at least a portion of the dc offset in the sensor signal.

7. The apparatus of claim 4, wherein the amplifier includes a differential amplifier, the differential amplifier having a first input that receives the sensor signal and a second input that receives a reference voltage, wherein the control signal generated by the processor serves as the reference voltage.

8. The apparatus of claim 2, wherein the detector includes a comparator that compares a level of dc offset in the amplified sensor signal to a reference level and produces a comparator output signal, and the controller controls the amplifier based on the comparator output signal.

9. The apparatus of claim 8, wherein the amplifier includes a differential amplifier, the differential amplifier having a first input that receives the sensor signal and a second input that receives a reference voltage, and the controller generates a control signal that adjusts the reference voltage received by the second input of the differential amplifier to cancel at least a portion of the dc offset in the sensor signal.

10. A passive infrared (PIR) sensor apparatus comprising:
a PIR sensor that generates a sensor signal;
an amplifier, dc-coupled to the PIR sensor, that amplifies the sensor signal; and
a circuit that compensates for dc offset in the sensor signal;
wherein the circuit includes a detector that detects dc offset in the sensor signal and a controller that controls the amplifier based on the detected dc offset to reduce dc offset in the amplified sensor signal;
wherein the controller and the detector are implemented by processes executed by a microprocessor, the microprocessor being programmed to detect dc offset in the amplified sensor signal, and generate a control signal to control the amplifier in response to detection of dc offset;
wherein the amplifier includes a differential amplifier, the differential amplifier having a first input that receives the sensor signal and a second input that receives a reference voltage, and wherein the control signal generated by the processor adjusts the reference voltage received by the second input of the differential amplifier to cancel at least a portion of the dc offset in the sensor signal; and
wherein the PIR sensor further comprises a resistor-capacitor circuit that sets the reference voltage, wherein the control signal charges a capacitor in the resistor-capacitor circuit at a duty cycle selected to adjust the reference voltage to cancel at least a portion of the dc offset in the sensor signal.

11. A method for processing a passive infrared (PIR) sensor signal comprising:
dc coupling a sensor signal from a PIR sensor to an amplifier having a first input that receives the sensor signal and a second input that receives a reference voltage;
amplifying the sensor signal with the amplifier; and
compensating for dc offset in the sensor signal by adjusting the reference voltage to cancel at least a portion of the dc offset in the sensor signal in incremental steps until the dc offset in the sensor signal is canceled to an acceptable level.

12. The method of claim 11, further comprising detecting dc offset in the sensor signal, and compensating the dc offset by controlling the amplifier based on the detected dc offset to reduce dc offset in the amplified sensor signal.

13. The method of claim 12, further comprising detecting dc offset in the sensor signal by detecting dc offset in the amplified sensor signal.

14. The method of claim 12, further comprising detecting the level of the dc offset and controlling the amplifier via processes executed by a processor, the processor receiving the amplified sensor signal from the amplifier to detect the level of dc offset and generating a control signal to control the amplifier.

15. The method of claim 14, wherein the amplifier includes a differential amplifier, the differential amplifier having a first input that receives the sensor signal and a second input that receives a reference voltage, the method further comprising applying the control signal generated by the processor to adjust the reference voltage received by the second input of the differential amplifier and thereby cancel at least a portion of the dc offset in the sensor signal.

16. The method of claim 15, wherein the amplifier is coupled to a resistor-capacitor circuit that sets the reference voltage, the method further comprising charging a capacitor in the resistor-capacitor circuit at a duty cycle selected to adjust the reference voltage to cancel at least a portion of the dc offset in the sensor signal.

17. The method of claim 12, further comprising comparing a level of dc offset in the amplified sensor signal to a reference level, and controlling the amplifier based on the comparator output signal.

18. The apparatus of claim 17, wherein the amplifier includes a differential amplifier, the differential amplifier having a first input that receives the sensor signal and a second input that receives a reference voltage, the method further comprising generating a control signal based on the comparator output signal that adjusts the reference voltage received by the second input of the differential amplifier to cancel at least a portion of the dc offset in the sensor signal.

19. A method for processing a passive infrared (PIR) sensor signal comprising:
dc coupling a sensor signal from a PIR sensor to a differential amplifier having a first input that receives the sensor signal and a second input that receives a reference voltage;
detecting dc offset in the sensor signal;
amplifying the sensor signal with the amplifier; and
compensating for dc offset in the sensor signal by controlling the amplifier based on the detected dc offset to reduce dc offset in the amplified sensor signal;
wherein detecting the level of the dc offset and controlling the amplifier are executed by a processor, the processor receiving the amplified sensor signal from the amplifier to detect the level of dc offset and generating a control signal to control the amplifier;
wherein the control signal generated by the processor is applied to adjust the reference voltage received by the second input of the differential amplifier and thereby canceling at least a portion of the dc offset in the sensor signal; and
wherein the amplifier is coupled to a resistor-capacitor circuit that sets the reference voltage, the method further comprising charging a capacitor in the resistor-capacitor circuit at a duty cycle selected to adjust the reference voltage to cancel at least a portion of the dc offset in the sensor signal.

20. A passive infrared (PIR) sensor apparatus comprising:
a PIR sensor that generates a sensor signal;
an amplifier that amplifies the sensor signal to produce an amplified sensor signal, the amplifier being dc-coupled to an output of the PIR sensor to receive the sensor signal, wherein the amplifier includes a differential amplifier having a first input that receives the sensor signal and a second input that receives a reference voltage;
a resistor-capacitor circuit that sets the reference voltage received by the second input of the amplifier; and
a detector that detects a level of the dc offset in the sensor signal; and
a controller that charges a capacitor in the resistor-capacitor circuit at a duty cycle selected to adjust the reference voltage to compensate for the dc offset in the sensor signal.

* * * * *